Patented June 17, 1947

2,422,627

UNITED STATES PATENT OFFICE 2,422,627

PROCESS OF REFINING HYDROCARBON MIXTURES

Friedrich Martin, Mulheim-Ruhr, and Wilhelm Gottschall and Hermann Velde, Oberhausen-Holten, Germany; vested in the Attorney General of the United States No Drawing. Application June 20, 1939, Serial No. 280,055. In Germany May 8, 1939

Sections 3 and 14, Public Law 690, August 8, 1946.
Patent expires May 8, 1959

11 Claims. (Cl. 196—147)

This invention relates to the refining of hydrocarbon mixtures, more particularly for the purpose of freeing them from substances capable of forming resinous or coloring matter.

To this end we treat individual hydrocarbons and mixtures of hydrocarbons with fuller's earth or similar adsorbent materials, more particularly such as have already been used in a similar hydrocarbon treatment by which the octane number of such hydrocarbons has been increased.

In our copending application for producing high knock rating gasoline, Serial No. 280,054, filed June 20, 1939, we have disclosed that the knock-proof of hydrocarbons of the most various kinds can be improved and their octane values increased by treating them with fuller's earth, preferably activated by hydrochloric or sulfuric acid or other acids or by an admixture of polymerising catalysts such as aluminium chloride, zinc chloride, boron fluoride, iron chloride or phosphoric acid, or by treating said hydrocarbons with other adsorbent materials such as silica gel or alumina, at a temperature of about 150–400° C. which in any case exceeds the temperature at which these materials are capable of freeing the hydrocarbon mixtures of this kind from impurities which lead to the formation of resinous or coloring substances. To such a treatment at relatively high temperatures may successfully be subjected for instance cracked gasolines recovered from natural or synthetic hydrocarbons, gasolines recovered by a polymerisation, gasolines recovered from hydrocarbon gases with the aid of activated carbon, and more particularly aliphatic olefines with straight chains and mixtures containing same. To these materials belong for instance the primary products of the benzine synthesis according to Fischer and Tropsch, i. e. the products which are recovered by merely physical methods, such as distillation or stabilization, from the products of the catalytic conversion of carbon monoxide and hydrogen. Instead of or in addition to these primary products there may be used as starting materials secondary products obtained therefrom by some subsequent treatment, for instance with activated carbon or by a distillation or a cracking treatment. The improvement of the knock-proof or knock-rating is particularly important for the gasolines which have been cracked under gentle conditions, for instance under a pressure of 4–15 atmospheres at a temperature above 400° C. and preferably between 500 and 550° C. with a cracking period of about half a minute, as disclosed more in detail in our copending application. In this treatment with fuller's earth or the other materials mentioned above the temperature may gradually be raised, while the treatment proceeds, more particularly when the capacity of the fuller's earth or similar materials of increasing the octane value of the hydrocarbons under treatment diminishes or disappears. A temperature of 400° C. should, as a rule, not be overstepped, since at higher temperatures the organic material may suffer decomposition. Even at the highest temperature, which is thus possible, the capacity of fuller's earth or similar materials of improving the octane value, however, practically vanishes after some time.

We have now found that the activity of fuller's earth and other materials does not yet disappear at this stage. According to our discovery all these materials are excellently adapted at this stage to adsorb impurities which might cause the formation of resinous or coloring substances, and more particularly to adsorb them from the hydrocarbon materials specified above. These hydrocarbon materials are in many cases somewhat discolored after having been subjected to the treatment with fuller's earth or similar adsorbent materials at relatively high temperatures for the purpose of increasing their octane value. They may now be refined and freed from the coloring impurities by a subsequent treatment with fuller's earth, preferably activated, or the other adsorbent catalytic materials specified above, which already were employed in a treatment at relatively high temperatures in accordance with our copending application until their capacity of increasing the octane value appeared to be exhausted.

In order to carry out this refining treatment, we prefer to first extract with suitable resin solvents, such as benzene, gasoline or carbon tetrachloride, the fuller's earth or similar materials, with which a hydrocarbon material, as specified above, had been treated at a relatively high temperature for the increase of its octane value. The fuller's earth or similar materials thus extracted are applied to the hydrocarbon mixture to be refined at temperatures between about 100 and 160° C. in the manner hitherto employed when gasoline hydrocarbons shall be freed by means of active fuller's earth from substances tending to form resins. As solvent in the previous extraction of the fuller's earth or similar materials there may also be employed a gasoline material which has already been refined according to the present invention.

*Example 1.*—A cracked gasoline recovered by a heat treatment at about 520° C. and under a pressure of 8 atms. from those primary products of a hydrogenation of carbon monoxides, which boiled between 200 and 330° C., was used as starting material. This cracked gasoline showed a density of 0.720 and an octane number of 58. At a temperature of 300° C. 50 liters per hour of this gasoline were passed into contact with 100 kgs. of a fuller's earth activated with sulfuric acid. The end product had an octane number of 78, but after some time showed a light yellow color.

This gasoline was now passed at 140° C. at the rate of 40 liters per hour into contact with 100 kgs. of a fuller's earth, which had previously been employed in a treatment at the higher temperature for the increase of the octane number until the capacity of the fuller's earth to improve the anti-detonating qualities appeared exhausted. At this stage the earth was washed out with gasoline and dried before it was used in the treatment of the gasoline at 140° C. The gasoline refined with the aid of this extracted and dried fuller's earth was found to be altogether clear and not to become discolored.

*Example 2.*—A cracked gasoline which contained 70% olefines and showed an upper boiling limit of 200° C. was treated at 250° C. with a fuller's earth activated by hydrochloric acid. In this first stage of the process the octane number of the gasoline was increased from 65 to 77. The end product obtained, however, had a light yellow color. It was now conducted, in a second stage, at a temperature of 130° C. at the rate of 30 liters per hour over 90 kgs. of the fuller's earth which had been employed in the first stage. This fuller's earth, which did not any longer appear to be capable of increasing the octane number, was washed out with gasoline and thereupon used for the removal of the resinous constituents from the gasoline obtained in the first stage. The end product obtained in the second stage was as clear as water and did not become discolored even after a long time.

Any of the hydrocarbon materials mentioned above and disclosed in our copending application may be treated on principle in the same manner in two stages, so that first its octane value is increased and thereupon the material refined. In the first stage all the steps disclosed in our copending application mentioned above may be applied.

Fuller's earth activated by hydrochloric acid or sulfuric acid, and more particularly fuller's earth recovered from Bavarian clay products by a treatment with acids, have been found to be particularly suitable also for the process according to the present invention.

While all the hydrocarbon materials mentioned above and more particularly the primary or secondary products of the gasoline synthesis carried out according to the method of Fischer and Tropsch, may advantageously be subjected to the two-stage treatment according to our invention, this treatment is of particular advantage if applied to gasoline hydrocarbons obtained by cracking under gentle conditions. For this cracking treatment results with a minimum of losses in a material with a relatively low octane value which may materially be increased by the first treatment with fuller's earth at high temperature, while the impurities still present in the mixture may easily be removed by a second treatment at relatively low temperature with the fuller's earth which had served in the first stage until its capacity of increasing the octane value of the hydrocarbon mixture was substantially exhausted.

Various changes may be made in the details disclosed in the foregoing specification without departing from the invention or sacrificing the advantages thereof.

We claim:

1. The process of refining hydrocarbon mixtures, which comprises contacting such hydrocarbon mixture, for the removal of impurities, at a temperature ranging between about 100 and 160° C. with an adsorbent catalytic material which had already been used in the treatment of a similar olefine-containing hydrocarbon mixture at a temperature between about 150 and 400° C. until its capacity of increasing the octane number of this mixture was substantially exhausted.

2. The process of claim 1, in which the adsorbent catalytic material is extracted between the first treatment carried out between 150 and 400° C. and the second treatment carried out between 100 and 160° C. with a solvent for the removal of resinous substances deposited therein during the first treatment.

3. The process of improving hydrocarbon mixtures containing olefines, which comprises contacting such a hydrocarbon mixture with an adsorbent catalytic material, at a temperature above that at which the same material is capable of removing from such hydrocarbon mixtures impurities tending to form resinous or coloring substances, thereupon separating the hydrocarbon mixture thus treated and the adsorbent catalytic material, extracting the adsorbent material for the removal of the substances deposited therein during the previous treatment and contacting it at a temperature between about 100 and 160° C. with said treated hydrocarbon mixture in order to remove therefrom impurities tending to form resinous or coloring substances.

4. The process of claim 1, in which the adsorbent catalytic material is an activated fuller's earth.

5. The process of claim 1, in which the adsorbent catalytic material contains a polymerizing catalyst.

6. The process of claim 1, in which the hydrocarbon mixture under treatment is a cracked gasoline.

7. The process of claim 1, in which the hydrocarbon mixture under treatment is a gasoline produced by a catalytic hydrogenation of carbon monoxide followed by a cracking treatment.

8. The process of claim 1, in which the hydrocarbon mixture under treatment is a gasoline produced by a catalytic hydrogenation of carbon monoxide followed by a cracking treatment carried out under gentle conditions so that the benzine thus produced contains preponderably mono-olefines and at most a small quantity of aromatic compounds.

9. The process of claim 1, in which the hydrocarbon mixture under treatment is a primary product of a conversion of carbon monoxide with hydrogen.

10. The process of claim 1, in which the hydrocarbon mixture under treatment has been obtained by distilling products of the conversion of carbon monoxide with hydrogen.

11. The process of claim 1, in which the hydrocarbon mixture under treatment has been obtained by treating products of the conversion of carbon monoxide with hydrogen with activated carbon.

FRIEDRICH MARTIN.
WILHELM GOTTSCHALL.
HERMANN VELDE.

REFERENCES CITED

The following references are of record in the file of this patent:

UNITED STATES PATENTS

| Number | Name | Date |
|---|---|---|
| 1,965,105 | Mandelbaum | July 3, 1934 |
| 2,127,654 | Stratford | Aug. 23, 1938 |
| 2,014,915 | Teichmann | Sept. 17, 1935 |
| 2,016,271 | Buell et al. | Oct. 8, 1935 |
| 2,162,716 | Hancock | June 20, 1939 |
| 1,882,000 | Cross | Oct. 11, 1932 |
| 2,091,892 | Stratford | Aug. 31, 1937 |
| 2,183,591 | Schulze | Dec. 19, 1939 |
| 2,167,602 | Schulze | July 25, 1939 |
| 2,197,799 | Gregory | Apr. 23, 1940 |
| 2,181,877 | Drennan | Dec. 5, 1939 |
| 1,895,081 | Miller et al. | Jan. 23, 1933 |
| 1,913,941 | Mittasch et al. | June 13, 1933 |

FOREIGN PATENTS

| Number | Country | Date |
|---|---|---|
| 327,421 | Great Britain | Apr. 4, 1930 |
| 287,141 | Great Britain | Feb. 7, 1929 |
| 292,231 | Great Britain | June 14, 1928 |